United States Patent
Hori et al.

(10) Patent No.: US 9,363,404 B2
(45) Date of Patent: Jun. 7, 2016

(54) IMAGE SCANNING APPARATUS

(71) Applicant: BROTHER KOGYO KABUSHIKI KAISHA, Nagoya, Aichi (JP)

(72) Inventors: Yuji Hori, Gifu (JP); Kentaro Sugiyama, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/672,351

(22) Filed: Mar. 30, 2015

(65) Prior Publication Data
US 2015/0281503 A1 Oct. 1, 2015

(30) Foreign Application Priority Data

Mar. 31, 2014 (JP) .................................. 2014-074038

(51) Int. Cl.
*H04N 1/04* (2006.01)
*H04N 1/028* (2006.01)

(52) U.S. Cl.
CPC ....... *H04N 1/02815* (2013.01); *H04N 1/02805* (2013.01)

(58) Field of Classification Search
CPC ........................ H04N 1/02815; H04N 1/02805
USPC ................. 358/461, 475, 406, 496, 509, 504; 382/274
See application file for complete search history.

(56) References Cited

U.S. PATENT DOCUMENTS

| | | | | |
|---|---|---|---|---|
| 4,807,045 A | * | 2/1989 | Shimano | ............... H04N 1/4076 358/461 |
| 7,324,236 B2 | * | 1/2008 | Ohashi | ................. H04N 1/4076 358/1.18 |
| 2003/0038983 A1 | * | 2/2003 | Tanabe | ................... H04N 1/401 358/461 |
| 2004/0105135 A1 | | 6/2004 | Sawada | |
| 2015/0281504 A1 | * | 10/2015 | Hori | ................... H04N 1/02885 358/461 |

FOREIGN PATENT DOCUMENTS

| | | |
|---|---|---|
| JP | 2000-125094 A | 4/2000 |
| JP | 2003-298813 A | 10/2003 |
| JP | 2012-204849 A | 10/2012 |

OTHER PUBLICATIONS

U.S. Appl. No. 14/932,149, filed Nov. 4, 2015.

* cited by examiner

*Primary Examiner* — Cheukfan Lee
(74) *Attorney, Agent, or Firm* — Scully, Scott, Murphy & Presser, PC

(57) ABSTRACT

An image scanning apparatus is configured to obtain a greatest gray gradation value when the light source illuminates the gray reference member at a first light quantity value, obtain a gradation value of a black signal output by the signal conversion unit when the light source is powered off, calculate a first difference value, set a second light quantity value, set a correction light quantity value, obtain a second difference value by subtracting the gradation value of the black signal from the second gradation value of a white signal, calculate a shading correction value based on a ratio of the second difference value to the first difference value, control the scanning unit to scan the image on the original sheet with controlling the light source to illuminate the original sheet in accordance with the second light quantity value, and apply the shading correction in accordance with the shading correction value.

9 Claims, 10 Drawing Sheets

IMAGE SCANNING APPARATUS

CROSS-REFERENCE TO RELATED APPLICATION

This application claims priority under 35 U.S.C. §119 from Japanese Patent Application No. 2014-074038 filed on Mar. 31, 2014. The entire subject matter of the application is incorporated herein by reference.

BACKGROUND

1. Technical Field

The present disclosures relate to an image scanning apparatus using a gray reference member of which a reflection coefficient is lower than that of a white reflection member.

2. Related Art

Generally, an image scanning apparatus employs a white reference member as a light distribution reference member to be used for a shading correction. When scanning is executed, an image of an original sheet passing over the white reference member is scanned. When the white reference member is used, however, there may occur a show-through phenomenon which is a phenomenon that a change in thickness of color on a back surface of the original sheet affects scanning of an image formed on a front surface of the original sheet. In order to reduce such a show-through phenomenon, image scanning apparatuses employing the gray reference member, which has a smaller reflection coefficient than the white reference member, have been suggested recently.

An example of such an image scanning apparatus employs a non-white reference member which is provided as a guide for the original sheet in a sheet conveying device. In such an image scanning apparatus, the shading correction is performed, based on the reflection coefficient of the non-white reference member, so that a reflection density obtained by scanning the non-white reference member has substantially the same quantity as a reflection density obtained by scanning the white reference member. When an image on the original sheet, which is conveyed by the conveying device, is scanned, the shading correction is applied based on the reflection density compensated as above.

SUMMARY

According to the conventional art as described above, a reflection density obtained by scanning the non-white reference member is compensated based on the reflection coefficient of the non-white reference member on the premise that the reflection density and the reflection coefficient have an inverse proportional relationship.

However, the reflection density obtained by scanning the light distribution reference member varies depending on various factors such as a surface condition of a reflecting surface of the light distribution reference member, diffusion characteristics of the reflection surface, and the like. Therefore, even if illumination light quantity of a light source is constant, the reflection density may not be precisely inversely proportional to the reflection coefficient of the light distribution reference member. Because of this, the compensated reflection density based on the reflection coefficient may be different from the reflection density by actually scanning the white reference member. Therefore, when an image of a white-tinged original sheet is scanned, even though the shading correction is performed using the compensated reflection density, there may occur fluctuation of thickness, or fluctuation of tone gradation in the scanned image.

In order to reduce such a fluctuation of tone gradation, it may be possible to obtain gradation values as white reference data and use the same for the shading correction by scanning the white reference member before an image of the conveyed original sheet is scanned on the non-white reference member. However, scanning of the white reference member every time the original sheet is scanned results in elongation of an operating time for the scanning.

In consideration of the above, aspects of the disclosures provide an improved image scanning apparatus capable of suppressing the fluctuation of tone gradation of the image which is scanned with use of the gray reference member without elongating the operating time for scanning.

According to aspects of the disclosures, there is provided an image scanning apparatus, which is provided with a gray reference member arranged in a conveying path in which an original sheet is to be conveyed, the gray reference member having a reflection coefficient smaller than that of a white color, a scanning unit configured to scan an image on the original sheet on a line basis, the scanning unit including a light source configured to illuminate the original sheet when passing the gray reference member and a plurality of photoelectric conversion elements aligned in a scanning direction which is a transverse direction of the conveying path, a signal conversion unit configured to convert analog signals from the plurality of photoelectric conversion elements to digital signals, and a controller. The controller is configured to obtain a greatest gray gradation value among a plurality of gradation values of gray signals output by the signal conversion unit when the light source illuminates the gray reference member at a first light quantity value, the first light quantity value being set so that white signals would be output by the signal conversion unit if the light source would illuminate a white reference member at the first light quantity, obtain a gradation value of a black signal output by the signal conversion unit when the light source is powered off, calculate a first difference value by subtracting the gradation value of the black signal from the greatest gray gradation value among a plurality of gradation values of gray signals, set a second light quantity value such that a gray signal having the gray gradation value is output by the signal conversion unit when the light source illuminates the gray reference member at the second light quantity value, set a correction light quantity value such that a white signal having a second gradation value is output by the signal conversion unit when the light source illuminates the gray reference member, obtain a second difference value by subtracting the gradation value of the black signal from the second gradation value of a white signal which is output by the signal conversion unit when the light source illuminates the gray reference member in accordance with the correction light quantity value, calculate a shading correction value based on a ratio of the second difference value to the first difference value, control the scanning unit to scan the image on the original sheet with controlling the light source to illuminate the original sheet in accordance with the second light quantity value, and apply the shading correction to the digital signal output by the signal conversion unit in accordance with the shading correction value.

According to aspects of the disclosures, the scanning unit may scan an image on one surface of the original sheet or images on both surfaces of the original sheet. In the latter case, two scanning units may be provided at the conveying path.

According to aspects of the disclosures, when the scanning unit is configured to obtain the gray gradation value and the first difference value before an image on the original sheet is scanned, the image on the original sheet may be scanned in accordance with a user's operation or automatically when a predetermined condition is fulfilled. Further, the gray gradation value and the first difference value may be detected and stored when the image scanning apparatus is manufactured or after the image scanning apparatus is shipped from a factory, in accordance with an operation of itself.

According to aspects of the disclosures, the second gradation value is the greatest gradation value of the white signal when the light source illuminates the gray reference member, and the value is determined based on the configuration of the photoelectric conversion elements and the signal conversion unit.

According to aspects of the disclosures, the first difference value or the second difference value may be a maximum difference value from among difference values calculated by subtracting the black signal gradation values from the white signal gradation values for respective pixels, or an averaged difference value which is an average of the difference values calculated by subtracting the black signal gradation values from the white signal gradation values for respective pixels.

BRIEF DESCRIPTION OF THE ACCOMPANYING DRAWINGS

FIG. 1 is a cross-sectional side view schematically showing main components of an image scanning apparatus according to an illustrative embodiment of the disclosures.

FIG. 2 schematically shows a scanning unit of the image scanning apparatus according to the illustrative embodiment of the disclosures.

FIG. 3 schematically shows a configuration of a light receiving unit of the scanning unit according to the illustrative embodiment of the disclosures.

DETAILED DESCRIPTION OF THE ILLUSTRATIVE EMBODIMENTS

Hereinafter, referring to the accompanying drawings, an image scanning apparatus 1 according to an illustrative embodiment of the disclosures will be described. In the following description, when directions are indicated, directions depicted in FIG. 1 will be referred to.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

Figure 1:
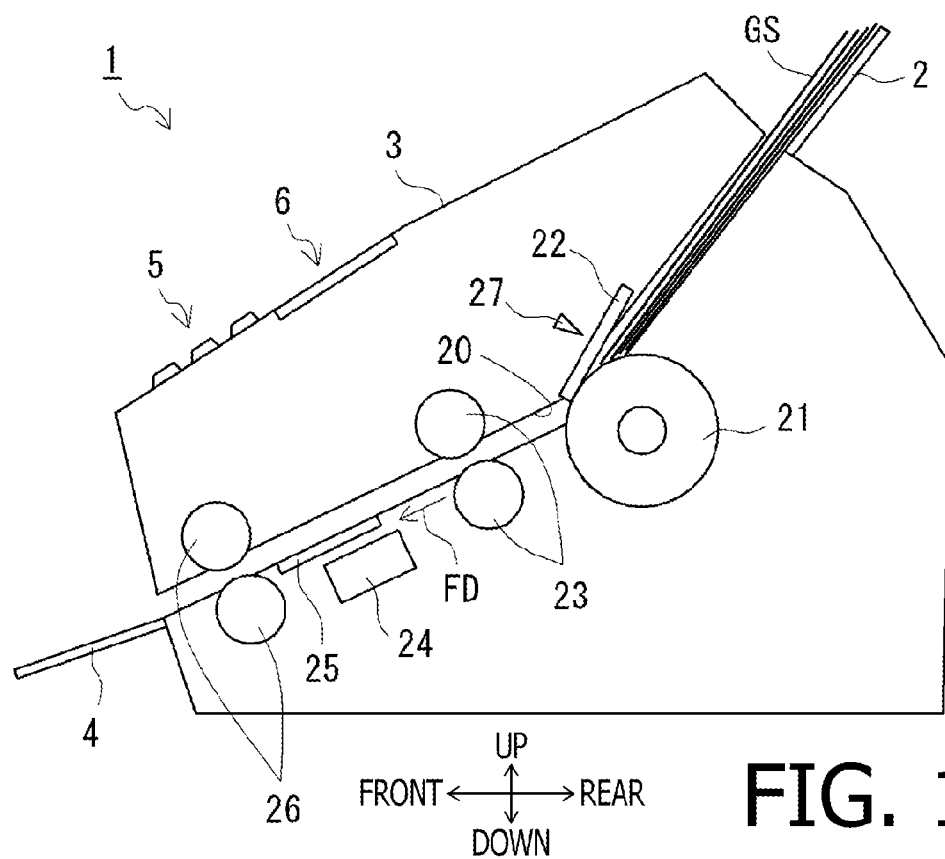

As shown in FIG. 1, the image scanning apparatus 1 has a sheet feeding tray 2, a main body 3, a discharged sheet tray 4. Further, an operation unit 5, a display unit 6 are arranged on an upper surface of the main body 3. The operation unit 5 includes a power switch, and various setting buttons, and is configured to acquire an operational instructions by a user. For example, the operation unit 5 may include a selection button to select a color mode using three colors or a monochrome mode using a single color, a resolution setting operation button, and the like. The display unit 6 includes an LCD (liquid crystal display) and displays an operational status of the image scanning apparatus 1.

A conveying path 20 is defined inside the main body 3. The original sheets GS placed on the sheet feeding tray 2 are conveyed in a conveying direction FD, along the conveying path 20, and is discharged on a discharged sheet tray 4. A feeding roller 21, a separation pad 22, a pair of upstream conveying rollers 23, a scanning unit 24, a platen glass 25 and a pair of downstream conveying rollers 26 are arranged along the conveying path 20 as shown in FIG. 1.

The feeding roller 21, in association with the separation pad 22, feeds the plurality of original sheets GS placed on the sheet feeding tray 2 one by one. The upstream conveying rollers 23 and the downstream conveying rollers 26 are driven by a conveying motor MT (see FIG. 4). The platen glass 25 is a transparent member and arranged along and below the conveying path 20. The conveying rollers 23 and 26 convey the original sheet GS fed from the feeding roller 21 to pass over the platen glass 25.

According to the illustrative embodiment, the original sheets GS are placed on the sheet feeding tray 2 such that a scan surface (i.e., a surface subject to scan) of each original sheet GS face the placement surface of the sheet feeding tray 2. The scanning unit 24 is arranged below the conveying path 20, and scans an image on the scan surface of the original sheet GS as it passes over the platen glass 25. An original sheet sensor 27 is arranged on the sheet feeding tray 2, which sensor 25 is turned ON when one or more original sheets GS are placed on the sheet feeding tray 2, while the sensor 25 is turned OFF when there is no sheet GS on the sheet feeding tray 2.

Figure 2:
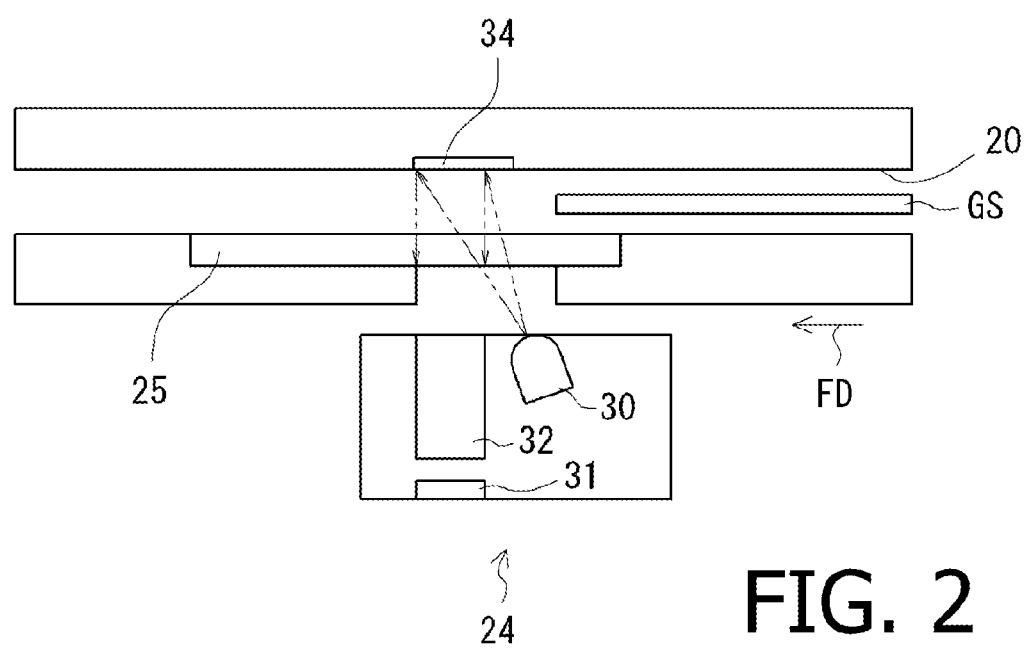

In FIG. 2, the scanning unit 24 has a light source 30, a light receiving unit 31, and an optical element 32. The light source 30 includes red, green and blue LEDs (light emitting diodes) emitting red, green and blue light, respectively. The light emitted from the light source 30 is reflected by the scan surface of the original sheet GS at a portion above the platen glass 25. Then, the reflected light is directed to the light receiving element 31 through the optical element 32. When the color mode is selected, one line of the image on the original sheet GS is scanned by sequentially turning on the red, green and blue LEDs. When the monochrome mode is selected, a specific one of the three-color LEDs (e.g., the red LED) is turned on to obtain one line of image on the original sheet GS.

A gray reference plate 34 is arranged at a position opposite to the scanning unit 24 with respect to the conveying path 20 and facing the scanning unit 24. The gray reference plate 34 has a lower reflection coefficient than a background color (i.e., white) of the original sheet GS. When there is not an original sheet GS in the conveying path 20, the light emitted by the light source 30 is reflected by the gray reference plate 34, and the reflected light is received, through the optical element 32, by the light receiving unit 31. According to the illustrative embodiment, the optical element 32 includes a rod lens extending in a direction of a main scanning direction MD (see FIG. 3).

Figure 3:
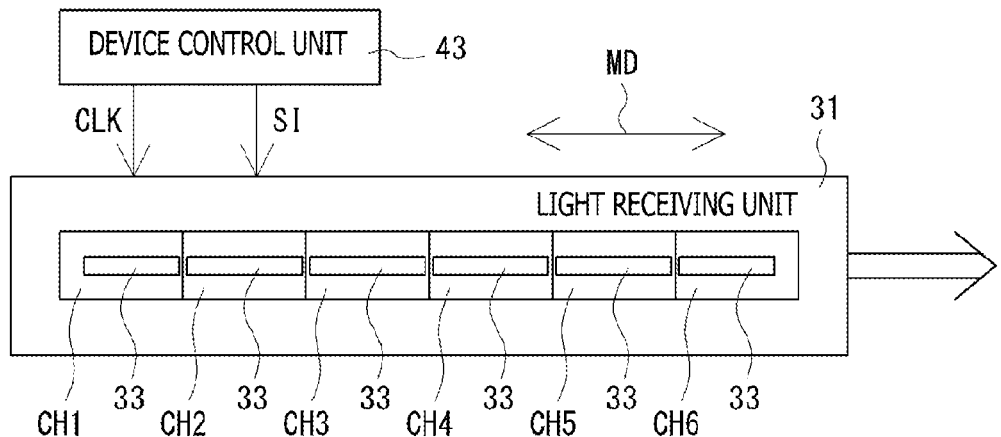

In FIG. 3, the light receiving unit 31 has a plurality of sensor IC (integrated circuit) chips linearly arranged in the main scanning direction MD. Each IC chip includes a plurality of photoelectric conversion elements 33 aligned in the main scanning direction MD, and further includes a shift register and a built-in amplifier. The plurality of sensor IC chips are divided into six channels CH1-CH6. Each channel includes one or two sensor IC chips. Since a configuration of such a sensor IC chip (i.e., one having a plurality of IC chips) is well-known, detailed description thereof will be omitted for brevity.

Figure 4:
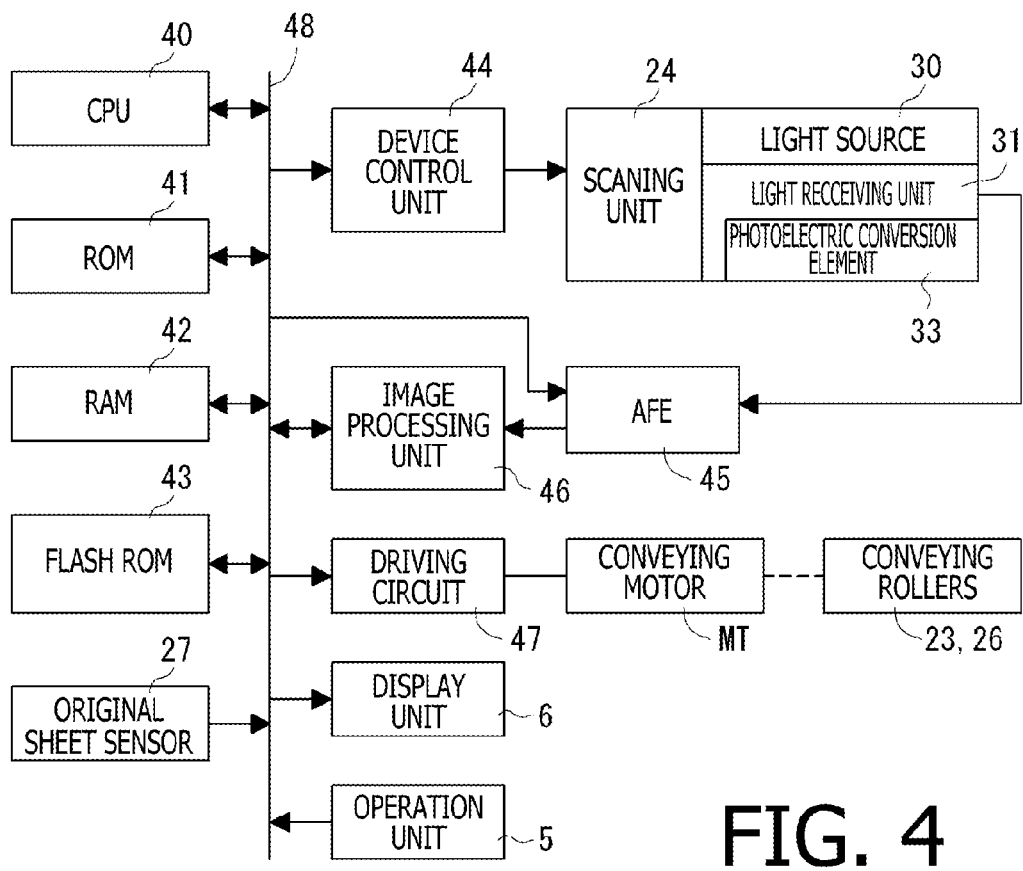
FIG. 4 is a block diagram showing an electrical configuration of the image scanning apparatus according to the illustrative embodiment of the disclosures.

As shown in FIG. 4, the scanning apparatus 1 includes a CPU (central processing unit) 40, a ROM (read only memory) 41, a RAM (random access memory) 42, a flash PROM (a flash programmable ROM) 43, a device control unit 44, an analog front end IC (hereinafter, abbreviated as AFE) 45, an image processing unit 46 and a driving circuit 47. These components are connected to the operation unit 5, the display unit 6 and the original sheet sensor 27 through a bus 48.

The ROM 41 stores programs causing the image scanning apparatus 1 to execute a maintenance main process, a scanning main process, and sub processes called in the main processes. The CPU 40 controls respective components/units in accordance with the programs retrieved from the ROM 41. The flash PROM 43 is a rewritable non-volatile memory and stores various pieces of data which are generated during processing of the CPU 40 (e.g., current values and illumination periods). The RAM 42 temporarily stores calculation results and the like generated during the controlling processes executed by the CPU 40.

The device control unit 44 is connected to the scanning unit 24, and transmits signals to control power on/off of the light source 30 and a signal to control a value of an electrical current flowing through the light source 30 to the scanning unit 24 under control of the CPU 40. Further, the device control unit 44 transmits a clock signal CLK and a serial in signal SI to the light receiving unit 31 (see FIG. 3) in order to sequentially drive the plurality of photoelectric conversion elements 33 of each of the IC chips of the light receiving unit 31 in accordance with instructions from the CPU 40. When the scanning unit 24 receives the illumination control signal from the device control unit 44, the scanning unit 24 powers on the light source 30 and transmits the analog signal corresponding to the light quantity of the light the light receiving unit 31 has received to the AFE 45.

The AFE 45 is connected to the scanning unit 24, and converts the analog signal transmitted from the scanning unit 24 to a digital signal in accordance with instructions from the CPU 40. The AFE 45 has a predetermined input range and resolution power. For example, when the resolution power is 10 bits, 1024 gradation steps (i.e., 0-1023) can be achieved. In such a case, the AFE 45 is capable of converting the analog signal transmitted from the scanning unit 24 into 10-bit digital signal (i.e., gradation data) represented in 1024 gradation steps. The gradation data converted and generated by the AFE 45 is transmitted to the image processing unit 46. The image processing unit 46 includes an ASIC (application-specific integrated circuit) particularly designed for an image processing, and applies various image processing operations to the gradation data. The image processing operations may include a shading correction, various types of other corrections (e.g., γ correction), a resolution conversion process and the like. The image processing unit 46 applies such image processing operations to the gradation data, and generates bit-rate converted image data, for example, eight-bit image data. The thus generated image data is transmitted through the bus 48 to the RAM 42 and stored therein.

The driving circuit 47 is connected to the conveying motor MT, and drives the conveying motor MT in accordance with driving instructions transmitted from the CPU 40. The driving circuit 47 rotates the conveying motor MT in accordance with a rotation amount and a rotation direction instructed by the driving instructions. When the conveying motor MT rotates by a predetermined amount, the conveying rollers 23 and 26 rotate by predetermined angles, thereby the original sheet GS being conveyed along the conveying path 20 by a predetermined distance.

The image scanning apparatus 1 mainly executes the maintenance main process, which is executed before the original sheet GS is scanned, and the scanning main process, which is executed to scan the original sheet GS. Steps M1-M10 of the maintenance main process and steps R1-R15 of the scanning main process, and steps of each sub process are executed by the CPU 40. A data processing the CPU 40 executes for one line is the process for each of the pixels of three colors in the color mode, or the process for each of the pixels of one specific color in the monochrome mode.

Figure 5:
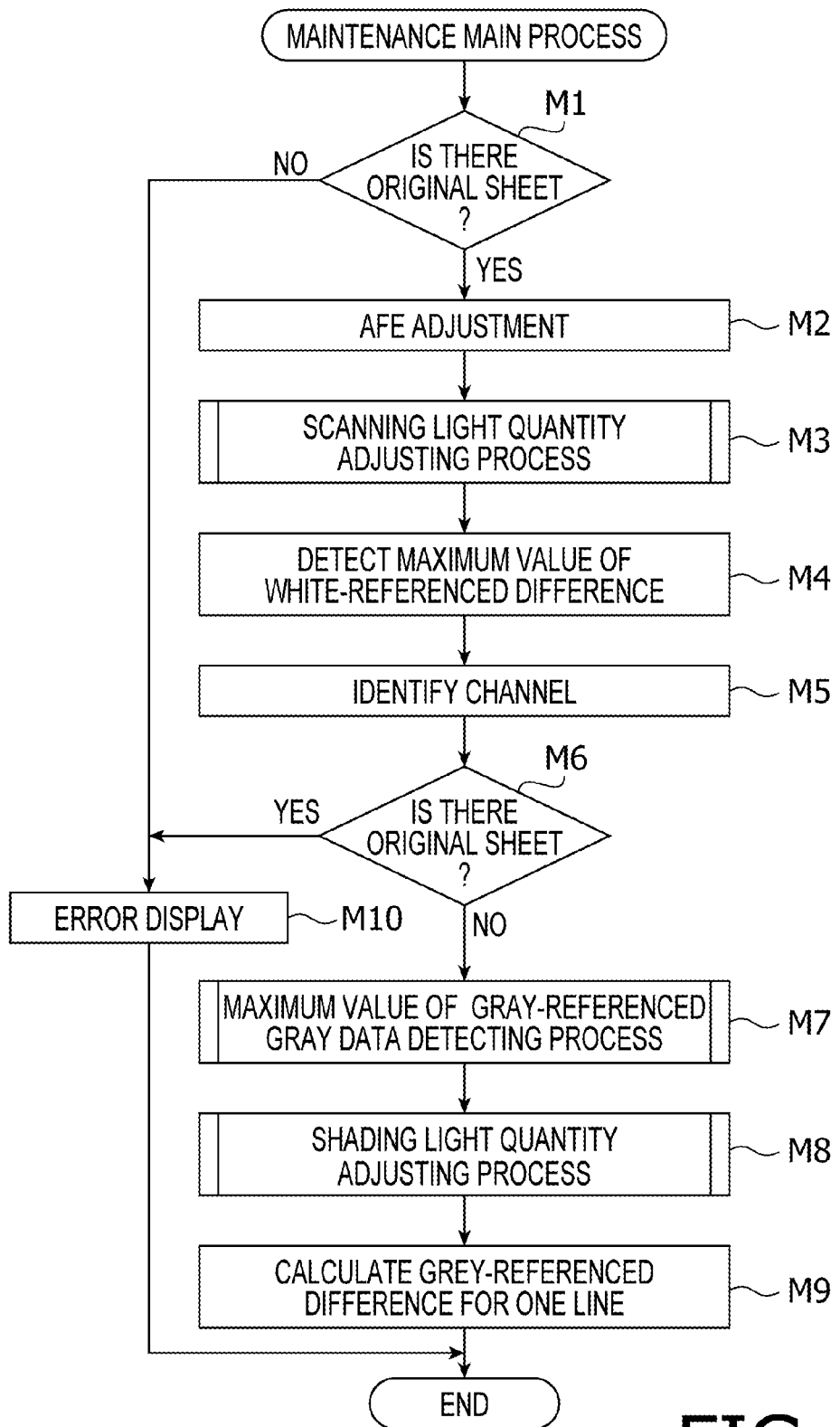
FIG. 5 is a flowchart illustrating a maintenance main process according to the illustrative embodiment of the disclosures.

The maintenance main process shown in FIG. 5 is executed before the image scanning apparatus 1 is shipped from a factory, or a maintenance operation is executed by a service person after the image forming apparatus 1 was shipped, and is started when an operator operates the operation unit 5 in accordance with a particular operation.

When the operator places a particular original sheet GS, which serves as a white reference, on the sheet feeding tray 2, the original sheet sensor 27 detects the particular original sheet GS. In accordance with a detection signal from the original sheet sensor 27, the CPU 40 determines whether the original sheet GS is in the sheet feeding tray 2 (M1). When there is an original sheet GS in the sheet feed tray 2 (M1: YES), the process proceeds to M2. When there is no original sheet GS in the sheet feeding tray 2 (M1: NO), the process proceeds to M10, and an error message notifying that there is no original sheet GS on the sheet feeding tray 2 is displayed on the display unit 6 (M10), and the maintenance main process is terminated.

In M2, various adjustment processes for the AFE 45 are executed. The AFE 45 outputs the gradation data within a range from the maximum gradation data to the minimum gradation data. When the gradation data is the 10-bit data, the maximum gradation data is "1023" and the minimum gradation data is "0". A maximum input voltage and a minimum input voltage to be input to the AFE 45 in order to output the maximum gradation data and the minimum gradation data, respectively, are preliminarily determined based on a configuration of an A/D convertor built in the AFE 45. It is also noted that a maximum output voltage and a minimum output voltage of the analog signal output by the photoelectric conversion element 33 of the light receiving unit 31 are preliminarily determined based on a configuration of the photoelectric conversion elements 33. Thus, as one of adjustment operations of the AFE 45, adjustment of an off-set value and an amplifier gain is executed.

In M3, a light quantity adjusting process is executed to adjust the scanning light quantity. The scanning light quantity adjustment process M3 is a process of calculating and setting an electrical current value VCrd and an illuminating period DLrd for the light source 30 to illuminate the white-reference original sheet GS. The scanning light quantity adjusting process M3 will be described in detail later.

In M4, a maximum value of white-referenced differences is detected. The gradation data of white color output by the AFE 45 in accordance with the analog signal transmitted from the light receiving unit 31 when the white-reference original sheet GS is illuminated under a state where the light source 30 is powered on in accordance with the current value VCrd and the illuminating period DLrd set in M3 (i.e., the light quantity adjusting process), or the white-referenced white data Dww is obtained repeatedly for each of the pixels of one line by predetermined times, and stored in the RAM 42.

Then, an average value Aww of the white-referenced white data Dww obtained by the predetermined times is calculated for each pixel of one line, and stored in the RAM 42. It is noted that the average value Aww is a value averaging the gradation values of the white-referenced white data Dww for each pixel.

Further, black gradation data the AFE 45 outputs in accordance with the analog signal transmitted from the light receiving unit 31, that is, white-referenced black data Dwb is repeatedly obtained for each of the pixels of one line by predetermined times and stored in the RAM 42. Then, an average value Awb of the white-referenced black data Dwb obtained by the predetermined times is calculated for each pixel of one line, and stored in the RAM 42. It is noted that the average value Awb is a value averaging the gradation values of the white-referenced black data Dwb for each pixel.

Next, a white-referenced difference SAw is calculated by subtracting the average value Awb from the average value Aww for each pixel of one line and stored in the RAM 42. Further, a maximum value SAwmax of the white-referenced differences SAw is detected and stored in the flash PROM 43.

In M5, a channel CHmax is identified. According to the illustrative embodiment, the average value Aww of the white-referenced white data Dww stored in the RAM 42 for each pixel of one line in stem M4 is retrieved. Then, in each of six channels CH1-CH6 of the light receiving unit 31, the maximum average value Awwmax of the average values Aww for each pixel of one line are detected. Then, among the maximum average values Awwmax respectively corresponding to the six channels, the largest one of the average value Awwmax is selected, and the channel CHmax having the largest average value Awwmax is identified. Channel information representing the channel CHmax having the largest (maximum) value is stored in the flash PROM 43.

In accordance with the detection signal transmitted from the original sheet sensor 27, the CPU 40 determines whether there is an original sheet on the sheet feeding tray 2 (M5). When there is no original sheet GS on the sheet feeding tray 2 (M6: NO), the process proceeds to a detection of maximum value of the gray-referenced gray data (M7). When there is an original sheet GS on the sheet feeding tray 2 (M5: YES), the process proceeds to step M10, in which an error message notifying that the original sheets GS are placed on the sheet feeding tray 2 by error is displayed on the display unit 6 (M10), and the maintenance process is terminated.

In M7, a maximum value of the gray-referenced gray data is detected. That is, the maximum gradation value Dggmax among the gradation values of the gray gradation data output by the AFE 45 in accordance with the analog signal transmitted from the light receiving unit 31 when the gray reference plate 34 is illuminated and the light receiving unit 31 receives light at a resolution RS under a condition where the light source 30 is powered on in accordance with the electrical current value VCrd and the illuminating period DLrd set in M3 (i.e., the light quantity adjusting process), or the gray-referenced gray data Dgg is detected. The maximum value Dggmax and the resolution RS are stored in the flash PROM 43. Detection of the maximum value of the gray-referenced gray data (M7) will be described in detail later.

In M8, the light quantity for the shading is adjusted. The shading light quantity adjustment (M8) is a process of calculating the electrical current value VCsh and the illuminating period DLsh when the light source 30 illuminates the gray reference plate 34 so that the AFE 45 outputs the gradation data having the highest gradation value. The shading light quantity adjustment in M8 will be described in detail later.

In M9, gray-referenced differences SAg for one line are calculated. The white gradation data output by the AFE 45 in accordance with the analog signal transmitted from the light receiving unit 31 under a state where the light source 30 is powered on in accordance with the electrical current value VCsh and the illuminating period DLsh set in M8 (i.e., the gray-referenced white data) Dgw is repeatedly obtained for each of the pixels of one line by a predetermined times and stored in the RAM 42. Then, an average value Agw of the repeatedly obtained gray-referenced white data Dgw is calculated for each of the pixels of one line and stored in the RAM 42. It is noted that the average value Agw is a value averaging the gradation values of the gray-referenced white data Dgw for each pixel.

Further, black gradation data the AFE 45 outputs in accordance with the analog signal transmitted from the light receiving unit 31, that is, the gray-referenced black data Dgb is repeatedly obtained for each of the pixels of one line by predetermined times, and stored in the RAM 42. Then, an average value Agb of the gray-referenced black data Dgb obtained by the predetermined times is calculated for each of the pixels of one line and stored in the RAM 42. It is noted that the average value Agb is a value averaging the gradation values of the gray-referenced black data Dgb for each pixel.

The gray-referenced difference Sag is calculated by subtracting the average value Agb from the average value Agw for each of the pixels of one line. Then, the white-referenced difference SAw which is stored for each pixel in M4 is retrieved, and a difference ratio is calculated by dividing the gray-referenced difference SAg by the white-referenced difference SAw for each pixel. Then, an average of the difference ratio for one line is calculated. Further, a threshold value is calculated by adding a predetermined value to the average of the difference ratio.

For each pixel, it is determined whether the difference ratio is greater than the threshold value. When at least one difference ratio is greater than the threshold value, it is determined that an anomaly pixel exists. In such a case, an error message instructing the user to re-execute the maintenance main process is displayed on the display unit 6. When all the difference ratios are equal to or less than the threshold value, the gray-referenced differences SAg for one line area stored in the flash PROM 43. When calculation of the gray-referenced differences for one line (M) is finished, the maintenance main process is terminated.

The predetermined value added to the average value of the difference ratio is determined in advance by experiment so that effects of anomaly pixels can be eliminated. According to the illustrative embodiment, the predetermined value is calculated by multiplying the average value of the difference ratio with a predetermined ratio. The predetermined ratio is determined based on causes such as a secular change of the gray reference plate 34, a variation of the analog voltages generated by the light receiving unit 31 of the scanning unit 24, and the like.

Next, referring to FIG. 6, a scanning light quantity adjusting process will be described, which is called in M3 of the maintenance main process shown in FIG. 5. When the light quantity adjusting process is started, various pieces of data are initialized (MA1). For example, illumination start time and end time of the light source 30, an electrical current value for the light source 30 are initialized. The illumination end time is set such that the illuminating period of the light source 30 becomes a longest possible period, while the electrical current value is set to be the smallest possible value.

In MA2, an overflow determination value is set. According to the illustrative embodiment, as the overflow determination value, the greatest gradation value of the gradation data stored in the flash PROM 43 is used. Thus, when the gradation data is a 10-bit data, "1023" is set as the overflow determination value.

In MA3, the light source 30 is powered on, and emits light in accordance with the initialized illumination start time, illumination end time, and electrical current value. As the light source 30 is powered on, the white-reference original sheet GS is illuminated by the light emitted by the light source 30, and the AFE 45 outputs the gradation data for each pixel in accordance with the analog signal received from the light receiving unit 31.

In MA4, the number PN of the overflow pixels is detected. According to the illustrative embodiment, the gradation data output by the AFE 45 for each of the pixels of one line is compared with the overflow determination value which is initialized in MA2, and the number of the pixels of which the gradation data represents a value greater than the overflow determination value.

In MA5, the CPU 40 determines whether the number PN of the pixels is equal to or greater than the predetermined number. It is noted that this step is executed to remove the gradation data of the anomaly pixels. The number of the anomaly pixels, of which the gradation data varies excessively due to dust or the like, is obtained by experiment within a channel in which the gradation data exhibiting the maximum gradation value within one line of gradation data, and thus obtained number of the anomaly pixels is set as the predetermined number therefor. According to the illustrative embodiment, the predetermined number is determined based on the resolution power, and is fifteen (15) when the resolution is 300 dpi (dots per inch). When the number PN of the pixels is less than the predetermined value (MA5: NO), the process proceeds to MA6, while when the number PN of the pixels is equal to or greater than the predetermined value (MA5: YES), the process proceeds to MA7.

When the number PN of the pixels is less than the predetermined number (MA5: NO), the electrical current value is increased (MA6), and the process proceeds to MA3. In MA3, the light source 30 is turned on in accordance with the initialized illumination start time and end time, and the electrical current value increased in MA6.

When the number PN of the pixels has reached the predetermined number, it is determined whether the electrical current value as increased in MA6 is greater than the maximum current value (MA7). When the electrical current value is greater than the maximum electrical current value (MA7: YES), the electrical current value is set to the maximum electrical current value (MA8), and the process proceeds to MA9. When the electrical current value is equal to or less than the maximum electrical current value (MA7: NO), the process proceeds to MA9.

In MA9, a change value is initialized. The change value is a minimum unit value for changing the illuminating period and preliminarily determined. Further, in MA10, the overflow determination value is set to the gradation data of the greatest gradation value stored in the flash PROM 43 as in step MA2.

In MA11, the light source 30 is powered on in accordance with the initialized start time and end time, and the electrical current value increased in MA6 or the maximum electrical current value set in MA8. As the light source 30 is power on, the white reference original sheet GS is illuminated by the light, and the AFE 45 outputs gradation data for each pixel in accordance with the analog signal output by the light receiving unit 31.

In MA12, the number PN of the overflow pixels is detected. According to the illustrative embodiment, the gradation data output by the AFE 45 is compared with the overflow determination value set in MA10, and the number of pixels exhibiting the gradation data of which value is equal to or greater than the overflow determination value is detected.

In MA13, it is determined whether the number PN of the pixels is greater than the predetermined number. It is noted that MA13 is executed, similar to MA5, to remove the gradation data of the anomaly pixels. The predetermined number is the same value as is used in MA5. When the number PN of the pixels is equal to or greater than the predetermined number (MA13: YES), the process proceeds to MA14. When the number PN of the pixels is less than the predetermined number (MA13: NO), the process proceeds to MA15.

When the number PN of the pixel is equal to or greater than the predetermined number, the illuminating period is reduced by the change value (MA14). That is, the illuminating period is shortened such that the end time becomes earlier by the change value initialized in MA9. After execution of MA14, the process returns to MA11. In MA11, the light source is powered on in accordance with the illuminating period which is reduced in MA14, and the electrical current value increased in MA6 or the maximum electrical current value set in MA8.

When the number PN of the pixels is less than the predetermined number, the illuminating period is increased by the change value (MA15), and the change value to be used next is calculated (MA16). According to the illustrative embodiment, the next change value is half the current change value.

In MA17, it is determined whether the change value calculated in MA16 is smaller than a minimum change value. When the change value is equal to or greater than the minimum change value (MA17: NO), process returns to MA11. When the change value is smaller than the minimum change value (MA17: YES), the process proceeds to MA18.

In MA18, the electrical current value and the illuminating period are stored in the flash PROM 43. That is, the electrical current increased in MA6 or the maximum electrical current value set in MA1 is stored in the flash PROM 43 as the electrical current VCrd for scanning, and the illuminating period increased in MA15, or the illumination start time and end time are stored in the flash PROM 43 as the illuminating period LDrd for scanning After execution of MA18, the light quantity adjusting process is terminated.

Figure 7:
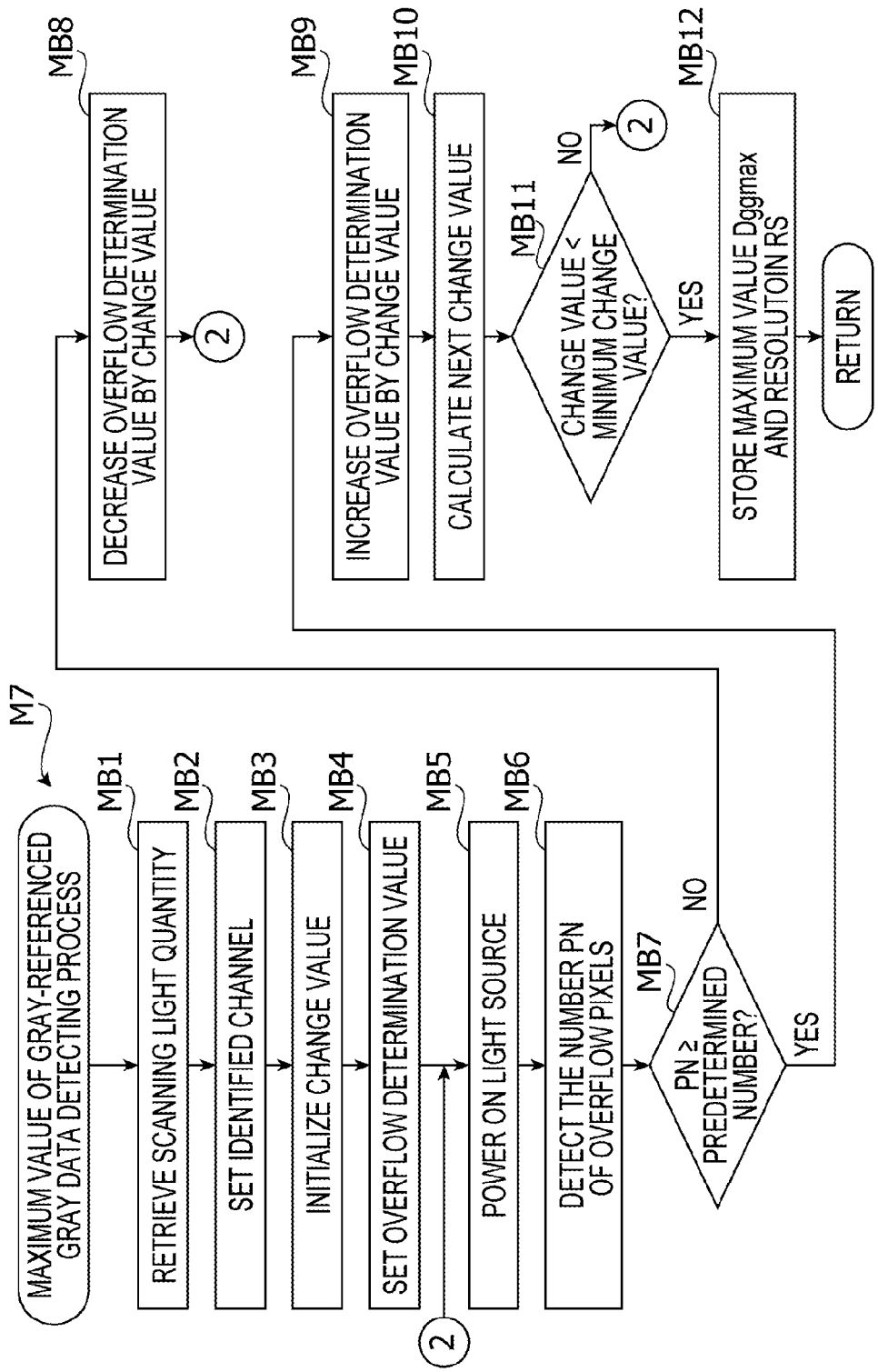
FIG. 7 is a flowchart illustrating a maximum value of gray-referenced gray data detection process, which is a process according to the illustrative embodiment of the disclosures.

When a maximum value of the gray-referenced gray data detection process shown in FIG. 7 is started, the scanning light quantity is retrieved (MB1). That is, the electrical current value VCrd and the illuminating period DLrd stored in the flash PROM 43 in MA18 are retrieved.

Then, the channel CHmax which is identified in M5 is set in accordance with channel information stored in the flash PROM 43 (MB2). Depending on the channel setting, only for the gradation data corresponding to the analog signal output by the photoelectric conversion element 33 of the set channel CHmax among the six channels CH1-CH6, a data processing shown in FIG. 7 is executed.

In MB3, the change value is initialized. The change value is a minimum unit value used to change the overflow determination value. In MB4, the overflow determination value is set. According to the illustrative embodiment, the overflow determination value is set to the highest value of the gradation data stored in the flash PROM 43. For example, when the gradation data is a 10-bit data, the highest gradation value of "1023" is set as the overflow determination value.

In MB5, the light source 30 is powered on in accordance with the electrical current value VCrd and the illuminating period DLrd retrieved in MB1. As the light source 30 is powered on, the gray reference plate 34 is illuminated by light, and the AFE 45 outputs the gray gradation data for each pixel, that is, the gray-referenced gray data in accordance with the analog signal transmitted from the light receiving unit 31.

In MB6, the number PN of the overflow pixels is detected. That is, for each of the pixels of the channel CHmax set in MB2, the gray-referenced gray data Dgg output by the AFE 45 is compared with the overflow determination value, and the number of pixels exhibiting the gray-referenced gray data Dgg which is equal to or greater than the overflow determination value is detected.

In MB7, it is determined whether the number PN of the pixels is equal to or greater than the predetermined number. It is noted that MB7 is executed in order to remove the gradation data of the anomaly pixels. The number of the anomaly pixels, of which the gradation data varies excessively due to dust or the like, is obtained by experiment and set as the predetermined number. According to the illustrative embodiment, the predetermined number is fifteen (15). When the number PN of the pixels is less than the predetermined number (MB7: NO), the process proceeds to MB8. When the number PN of the pixels is equal to or greater than the predetermined number (MB7: YES), the process proceeds to MB9.

In MB8, when the number PN of the pixels is less than the predetermined number, the overflow determination value is reduced by the change value set in MB3, and the process returns to MB5.

In MB9, when the number PN has reached the predetermined number, the overflow determination value is increased by the change value set in MB3. Then, the next change value is calculated (MB10). According to the illustrative embodiment, the next change value is half the current change value.

In MB11, it is determined whether the change value is smaller than the minimum change value. When the change value is equal to or greater than the minimum change value (MB11: NO), the process returns to MB5. When the change value is smaller than the minimum change value (MB11: YES), the process proceeds to MB12.

In MB12, the overflow determination value and the resolution power are stored. That is, the overflow determination value increased in MB9 and the resolution of the gray-referenced gray data Dgg compared with the overflow determination value in MB6 are stored in the flash PROM 43. After execution of MB12, the maximum value of gray-referenced gray data detection process shown in FIG. 7 is terminated.

The overflow determination value stored in MB12 corresponds to the maximum value Dggmax which is the maximum gradation value among the gradation values of the gray-referenced gray data output by the AFE 45 excluding the gray-referenced gray data Dgg of the anomaly pixels under a state where the light source 30 illuminates the gray reference plate in accordance with the electrical current value VDrd and the illuminating period DLrd which are the values causing the AFE 45 to output the maximum gradation data when the white reference original sheet GS is illuminated. Therefore, in this specification, the overflow determination value and the resolution stored in MB12 will be referred to as the maximum value Dggmax and the resolution RS, respectively.

Figure 8:
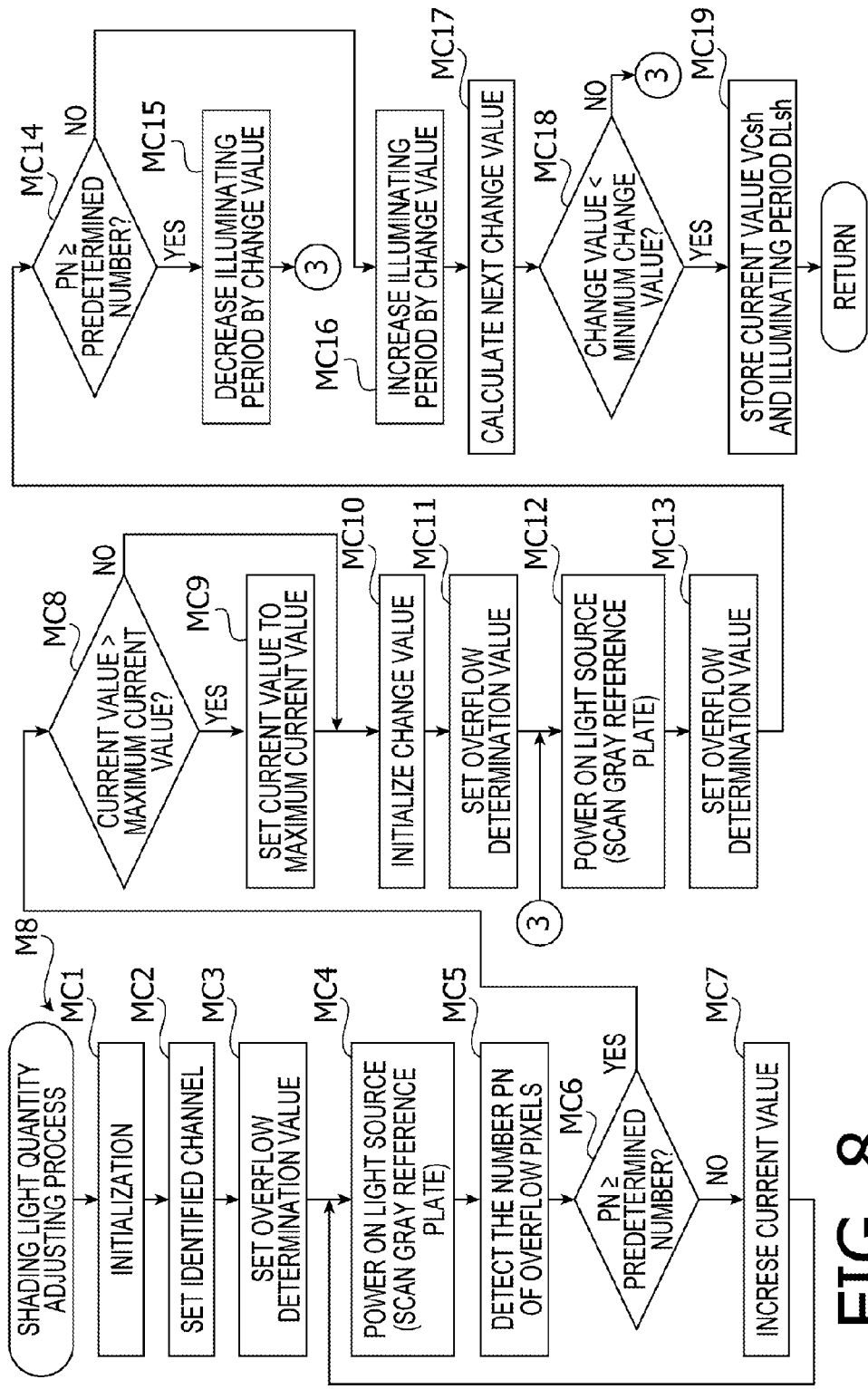
FIG. 8 is a flowchart illustrating a shading light quantity adjusting process, which is a process to adjust light quantity for shading, according to the illustrative embodiment of the disclosures.

Next, the shading light quantity adjusting process, which is called in M8 of the maintenance main process, will be described with reference to FIG. 8. When the shading light quantity adjusting process is started, steps MC1, MC3-MC19 which are similar to steps MA1-MA18 which are the steps of the scanning light quantity adjusting process are executed. Since the steps are substantially similar, among the steps shown in FIG. 8, ones different from the steps of the scanning light quantity adjusting process will be described.

In MC1, data is initialized (MC1). For example, the illuminating period, the illumination start/end times, and the electrical current value for the light source 30 are initialized. At this stage, the illumination end time is set such that the illuminating period of the light source 30 has a maximum period, and the electrical current is set to the minimum current value.

The channel CHmax identified in M5 (see FIG. 5) is set in MC2 in accordance with the channel information stored in the flash PROM 43. By setting the channel, data processing in the shading light quantity adjusting process is executed using the gradation data corresponding to the analog signal output by the photoelectric conversion element 33 of the thus set channel CHmax among the six channels CH1-CH6.

In MC3, the overflow determination value is set. That is, the overflow determination value is set to the gradation data having the highest gradation value stored in the flash PROM 43. For example, when the gradation data is 10-bit data, "1023" is set as the overflow determination value in MC3.

Steps MC4-MC9 are executed similarly to steps MA3-MA8 described above, and the electrical current value for the shading is determined. It is noted, however, in step MC5, the gradation data output by the AFE 45 for each pixel in the channel CHmax which is set in MC2 is compared with the overflow determination value set in MC3, and the number of the pixels, in the set channel CHmax, having the gradation data of which value is equal to or greater than the overflow determination value.

In MC10, the change value is initialized. The change value is the minimum unit value for changing the illuminating period, and preliminarily determined. Further, the overflow determination value is set to the gradation data of the highest gradation value stored in the flash PROM 43, as in MC3.

Steps MC12-MC18 are executed similarly to steps MA11-MA17, and the illuminating period is determined. It is noted that, in MC13, the gradation data output by the AFE 45 for each pixel in the channel CHmax which is set in MC2 is compared with the overflow determination value set in MC11, and the number of pixels, in the set channel CHmax, having the gradation data of which value is equal to or greater than the overflow determination value.

In MC19, the electrical current value and the illuminating period are stored in the flash PROM 43. That is, the electrical current value increased in MC7 or set to the maximum electrical current value in MC9 is stored in the flash PROM 43 as the electrical current value VCsh for the shading, and the illuminating period increased in MC16 (i.e., the illumination start/end times) is stored, as the illuminating period DLsh for the shading, in the flash PROM 43. After execution of MC19, the shading light quantity adjusting process is terminated.

Figure 9:
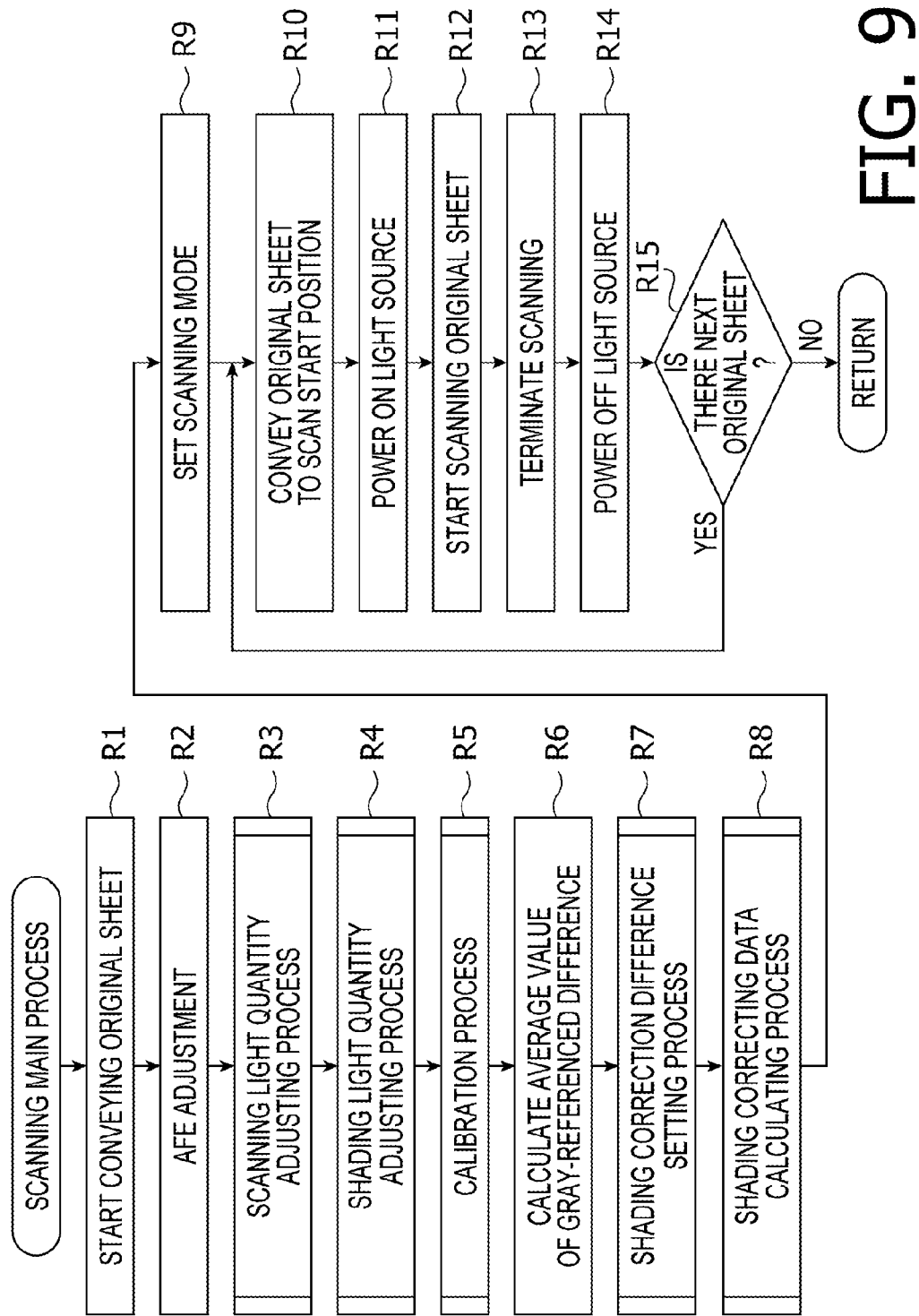
FIG. 9 is a flowchart illustrating a scanning main process according to the illustrative embodiment of the disclosures.

FIG. 9 shows a scanning main process, which is started when the user places the original sheets GS in the sheet feeding gray 2 and operates a scanning start button of the operation unit 5.

When the user operates the scanning start button of the operation unit 5, the original sheet sensor 27 detects the original sheets GS. In response to the detection signal output by the original sheet sensor GS, conveying of the original sheets GS is started (R1). In R2, various adjustments for the AFE 45 are executed. Since the adjustment of the AFE 45 is executed similar to that executed in M2 of the maintenance main process, detailed description thereof will be omitted for brevity.

As a process different from the scanning light quantity adjusting process (M3), a step of setting the channel CHmax identified in M5 based on the channel information stored in the flash PROM 43 is added between steps MA1 and step MA2. Accordingly, in this case, the gradation data output by the AFE 45 and converted with the overflow determination value in MA4 and MA12 is limited to the gradation data in the identified channel CHmax.

In MA2 and MA10, the overflow determination value is set to the gradation data of the highest gradation value stored in the flash PROM 43. In the scanning light quantity adjusting process (R3), however, the overflow determination value is set to the maximum value Dggmax of the gray-referenced gray data Dgg stored in the flash PROM 43 in MB12.

Figure 6:
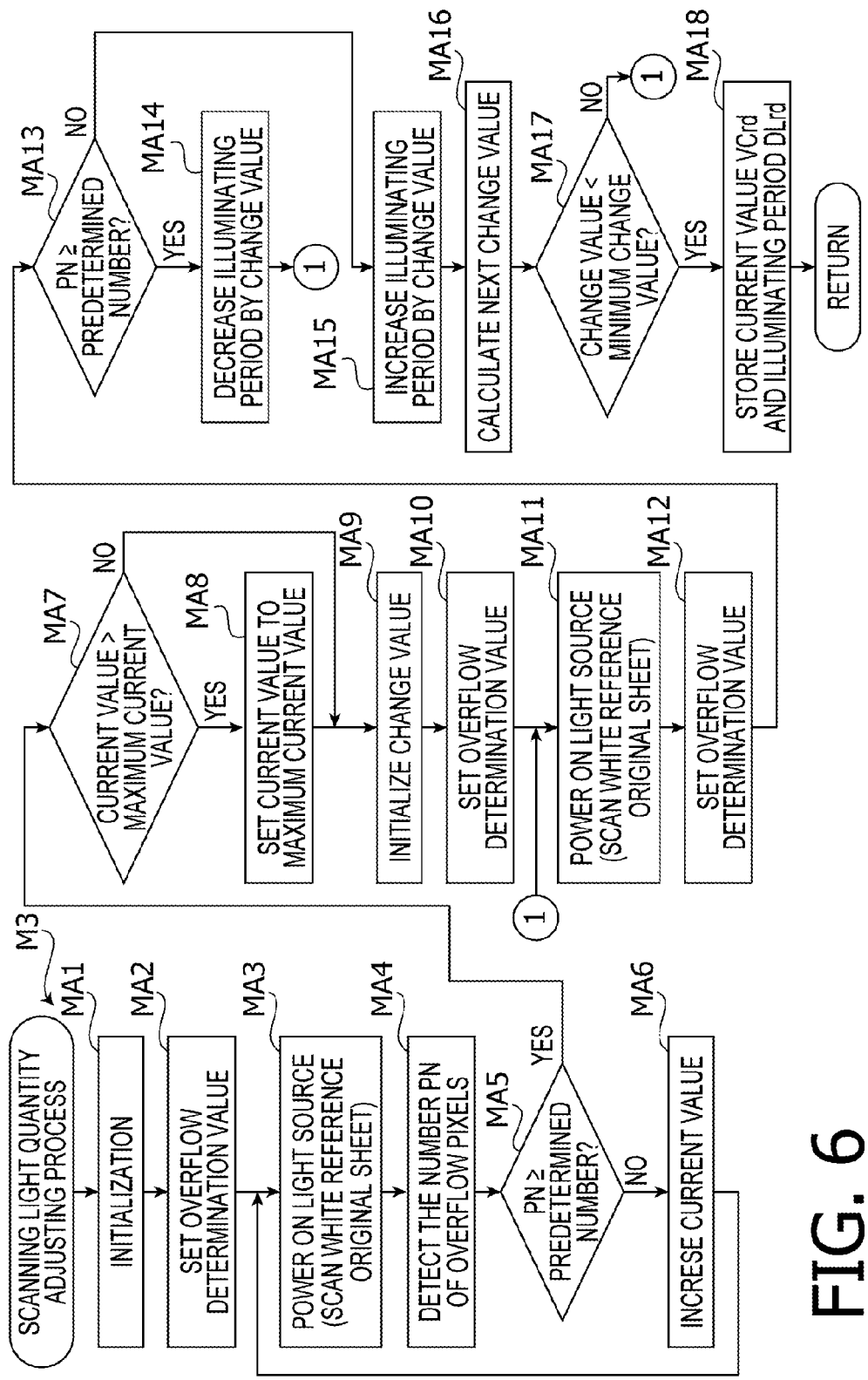
FIG. 6 is a flowchart illustrating a scanning light quantity adjusting process, which is a process to adjust light quantity for scanning, according to the illustrative embodiment of the disclosures.

Further, in MA18 shown in FIG. 6, the electrical current value VCrd and the illuminating period DLrd are stored in the flash PROM 43 as the electrical current value and the illuminating period in the maintenance main process. In contrast, in the scanning light quantity adjusting process, the electrical current value VCrd1 and the illuminating period DLrd1 are stored in the flash PROM 43 as the electrical current value and the illuminating period for scanning in the original sheet scanning process.

In R4, the shading light quantity is adjusted. The adjustment of the shading light quantity includes the steps similar to steps MC1-MC29 of the shading light adjusting process (M8) of the maintenance main process. It is noted that, in MC19 shown in FIG. 8, the electrical current value VCsh and the illuminating period DLsh are stored in the flash PROM 43 as the electrical current value and the illuminating period of the shading in the maintenance main process. However, in R4 of the shading light quantity adjusting process, the electrical current value VCsh1 and the illuminating period DLsh1 are stored in the flash PROM 43 as the electrical current value and the illuminating period for the shading in the original sheet scanning process.

In R5, a calibration is executed. When a difference between the maximum value Dggmax1 which is detected in the calibration step R5 and the maximum value Dggmax of the gray-referenced gray data detected in M7 exceeds a predetermined value, the scanning light quantity adjusting process is re-executed. Details of the calibration will be described later.

In R6, an average value of the gray-referenced data is calculated. When the gray reference plate 34 is illuminated by the light source 30 which is driven in accordance with the electrical current value VCsh1 and the illuminating period DLsh1 set in R4, the white gradation data output by the AFE 45 in accordance with the analog signal transmitted from the light receiving unit 31, that is the gray-referenced gray data Dgw is repeatedly obtained for each of pixels of one line by the predetermined times and stored in the RAM 42. An average value Agw of the gray-referenced white data Dgw repeatedly obtained by the predetermined times is calculated for each pixel and stored in the RAM 42.

Figure 13:
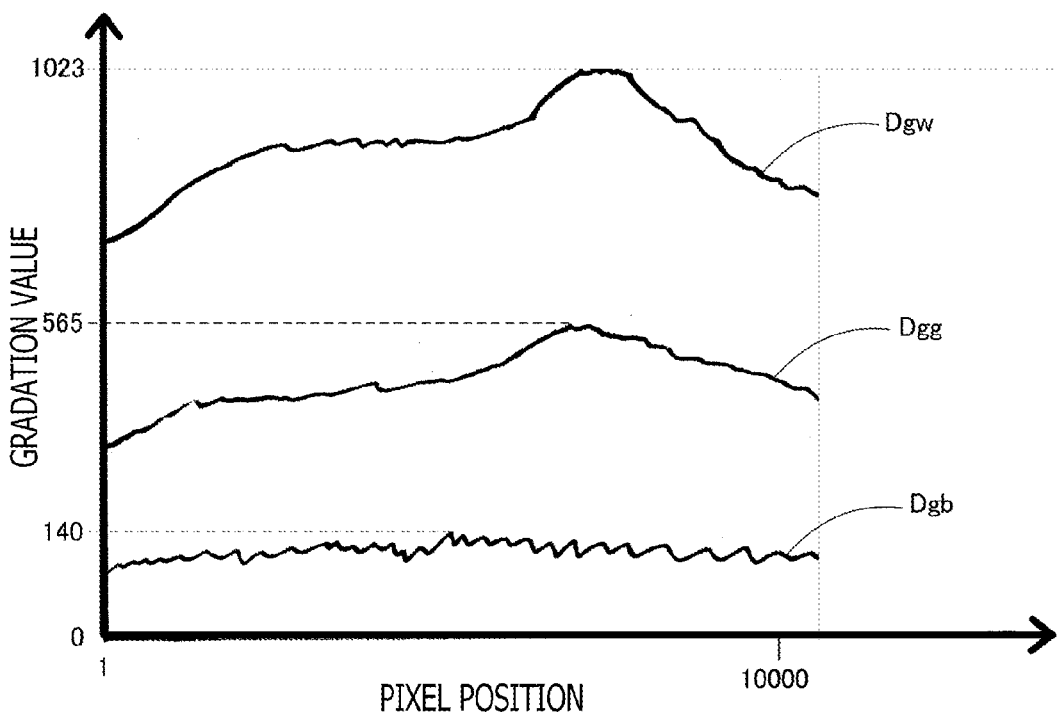
FIG. 13 is a graph showing gradation values of gray-referenced white data, gray-referenced gray data, and gray-referenced black data.

When the light source 30 is powered off, the back gradation data output by the AFE 45 in accordance with the analog signal transmitted from the light receiving unit, that is, the gray-referenced black data) Dgb is repeatedly obtained for each of the pixels of one line, and stored in the RAM 42. An average value Agb of the gray-referenced black data Dgb obtained by the predetermined times is calculated for each pixel and stored in the RAM 42. FIG. 13 shows change of the gradation values of the gray-referenced white data Dgw and the gray-referenced black data Dgb for one line. It is noted that, in FIG. 13, a vertical axis represents the gradation value of the gradation data output by the AFE 45, while a horizontal axis represents a position of each of the pixels of one line, from a top thereof to the end thereof. In FIG. 13, the gray-referenced gray data Dgg is also indicated.

In R7, the shading correction difference is set. When the gray-reference difference is greater than the threshold value, the gray-reference difference of the anomaly pixel is replaced with gray-reference differences of neighboring pixels, the gray-reference difference of the anomaly pixel is corrected. The one line of gray-reference differences including the corrected gray-reference difference are set as the shading correction difference. Details of setting of the shading correction difference will be described later.

In R8, the shading correction data is calculated. By a series of processes including a process of calculating a shading target value Atw, the shading data is calculated. Details of calculation of the shading correction data will be described later.

In R9, the scanning mode is set. As settings of the scanning mode, a selection between the color mode and the monochrome mode, setting of the resolution and the like is executed. After setting of the scanning mode is executed, the original sheet GS is conveyed to the scanning start position (R10). That is, the original sheet GS is conveyed with use of the feeding roller 21 and the upstream conveying rollers 23 until a leading end of the original sheet GS reaches a predetermined position on an upstream side of the scanning unit 24. Thereafter, the light source 30 is driven in accordance with the electrical current value VCrd1 and the illuminating period DLrd1 set in R3, or the electrical current value VCrd2 and the illuminating period DLrd2 set in RA8, and the original sheet GS is illuminated by the light emitted by the light source 30 (R11).

In R12, scanning of the original sheet GS is started. When the image of the original sheet GS is scanned, the AFE 45 generates the gradation data in accordance with the analog signal transmitted from the light receiving unit 31, and transmits the generated gradation data to the image processing unit 46. The image processing unit 46 receives the shading correction data which is calculated in R8 from the CPU 40. Then, the image processing unit 46 corrects the gradation data with use of the shading correction data and generates image data. The thus generated image data is stored in the RAM 42.

When a trailing end of the original sheet GS has passed the scanning unit 24, the scanning of the original sheet GS is completed (R13). When the scanning is completed, the light source 30 is powered off (R14). Based on the detection signal from the original sheet sensor 37, it is determined whether there exists a next original sheet GS (R15). When there is a next original sheet GS to be scanned (R15: YES), the process returns to R10. When there is not a next original sheet GS (R15: NO), the scanning main process is terminated.

Next, the calibration process shown in FIG. 10 will be described. When the calibration process is started, scanning light quantity used to cause the light source 30 to illuminate the gray reference plate is retrieved (RA1). That is, the electrical current value VCrd1 and the illuminating period DLrd1 stored in the flash PROM 43 in R3 are retrieved.

In RA1, the maximum value of the current gray-referenced gray data is detected. It is noted that the detection of the maximum value of the gray-referenced gray data in RA2 is executed by steps similar to the steps MB2-MB12 of the maximum value of gray-referenced data detection process (FIG. 7). In MB1 of FIG. 7, the electrical current value VCrd and the illuminating period DLrd stored in the flash PROM 43 in M3 are retrieved. However, when RA2 is executed, since the electrical current value VCrd1 and the illuminating period DLrd1 are retrieved in RAL there is no step corresponding to MB1. When the gray-referenced gray data maximum value detection (RA) is executed, the maximum value Dggmax1 of the current gray-reference gray data Dgg1 and the current resolution RS1 are stored in the flash PROM 43.

In RA3, the maximum value of the previous gray-referenced gray data is retrieved. That is, the maximum value Dggmax of the previous gray-referenced gray data Dgg stored in the flash PROM 43 in MB12 is retrieved.

In RA4, a difference of the maximum values is calculated. That is, by subtracting the previous maximum value Dggmax retrieved in RA3 from the current maximum value Dggmax1 stored in the flash PROM 43 in RA2, the difference (Dggmax1−Dggmax) is calculated.

In RA5, it is determined whether the difference (Dggmax1−Dggmax) is greater than a predetermined value. The predetermined value is preliminarily determined by experiment. Generally, the gray reference plate 34 deteriorates across the ages. Therefore, the gradation data output by the AFE 45 when the gray reference plate 34 is illuminated by the light source 30 gradually increases across the ages. To deal with such a secular change, according to the illustrative embodiment, a limit value of the difference is determined. When the difference is equal to or less than the predetermined value (RA5: NO), the calibration process is terminated. When the difference is greater than the predetermined value (RA5: YES), the process proceeds to RA6.

In RA6, the scanning light quantity for the light source 30 to illuminate the gray reference plate 34 is retrieved as in RA1. That is, the electrical current value VCrd1 and the illuminating period DLrd1 stored in the flash PROM 43 in R3 are retrieved.

In RA7, the maximum value of the gray-reference gray data is detected as in RA2. That is, detection of the maximum value in RA7 is executed in accordance with the steps similar to MB2-MB12 of the process shown in FIG. 7. In the maximum value of gray-referenced data detection process in FIG. 7, the electrical current value VCrd and the illuminating period DLrd which are stored in the flash PROM 43 in M3 (FIG. 5) are retrieved. However, since the electrical current value VCrd1 and the illuminating period DLrd1 are retrieved in RA6, in step RA7, a step corresponding to MB1 does not exist. After execution of RA7, a maximum value Dggmax2 of new gray-reference gray data Dgg2 and a new resolution RS2 are stored in the flash PROM 43.

In RA8, the scanning light quantity is adjusted. A light quality adjusting process in RA8 is executed similar to the process R3. In RA8, the overflow determining value is set to the maximum value Dggmax2 of the new gray-referenced gray data Dgg2 stored in the flash PROM 43 in RA7. Further, in RA8, the new electrical current value VCrd2 and the new illuminating period DLrd2 are stored in the flash PROM 43 as the electrical current value and the illuminating period for scanning.

Figure 11:
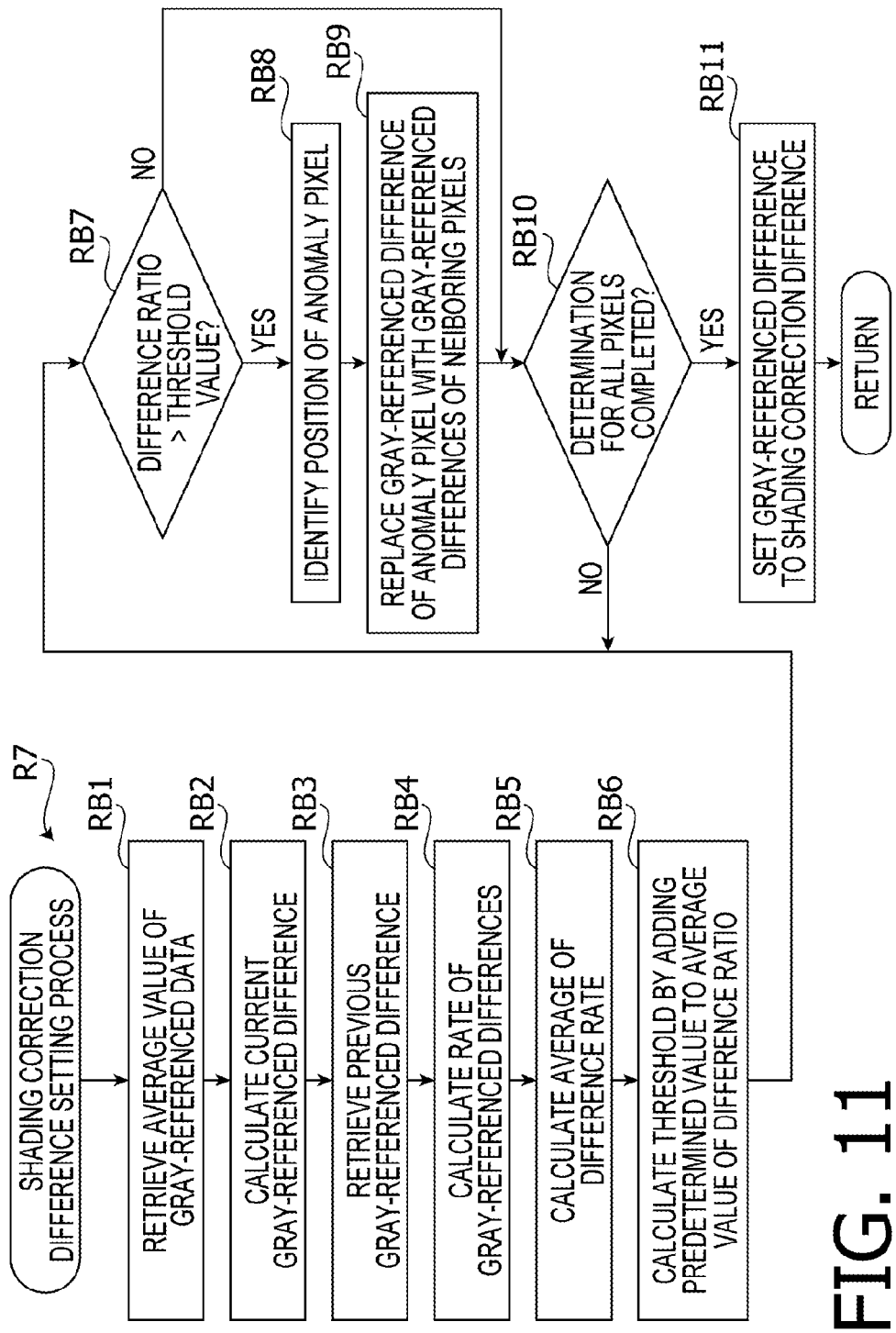
FIG. 11 is a flowchart illustrating a shading correction difference setting process according to the illustrative embodiment of the disclosures.

When the shading correction difference setting process shown in FIG. 11 is started, average value of the gray-referenced data for each of the pixels of one line is retrieved (RB1). That is, the average value Agw of the gray-referenced white data Dgw and the average value Agb of the gray-referenced black data Dgb stored in the RAM 42 in R6 are retrieved for each of the pixels of one line.

In RB2, a current gray-referenced difference is calculated. That is, by subtracting the average value Agb of the gray-reference black data Dgb from the average value Agw of the gray-reference white data Dgw retrieved in RB1, the current gray-referenced difference SAg1 of each of the pixels of one line is calculated and stored in the RAM 42. The current gray-referenced difference SAg1 is the gray-referenced difference calculated in the scanning main process.

In RB3, the previous gray-referenced difference is retrieved. That is, the previous gray-referenced difference SAg2 stored in the flash PROM 43 in M9 is retrieved for each of the pixels of one line. The previous gray-referenced difference SAg2 is the gray-reference difference calculated in the maintenance main process and a difference calculated by subtracting the average value Agb of the gray-referenced black data Dgb from the average value Agw of the gray-referenced white data Dgw.

In RB4, the ratio of the gray-referenced differences is calculated. That is, a difference ratio (Sag1/Sag2) for each of the pixels of one line is obtained by dividing the current gray-referenced difference SAg1 with the previous gray-referenced difference SAg2.

In RB5, an average of the difference ratios of the gray-referenced differences is calculated (RB5). Then, a threshold value is calculated by adding a predetermined value to the average of the difference ratio (RB6). The predetermined value is preliminarily determined through experiment so that effects of the anomaly pixels can be removed. According to the illustrative embodiment, the predetermined value is determined by multiplying the average of the difference ratio by a predetermined ratio. The predetermined ratio is preliminarily determined taking causes such as secular change of the gray reference plate 34, variation of the analog voltage generated by the light receiving unit 31 and the like into consideration.

In RB7, it is determined whether the difference ratio of the gray-referenced difference is greater than the threshold value. When the difference ratio of the gray-referenced difference is greater than the threshold value (RB7: YES), the process proceeds to RB8. When the difference ratio of the gray-referenced difference is equal to or less than the threshold value (RB7: NO), the process proceeds to RB10.

When the difference ratio of the gray-referenced difference is greater than the threshold value, a position of the anomaly pixel can be identified (RB8). That is, when the difference ratio is greater than the threshold value, the pixel having the current gray-referenced difference SAg1 is identified as the anomaly pixel, and the position of the anomaly pixel within one line can be identified.

In RB9, the gray-referenced difference of the anomaly pixel is replaced with the gray-referenced difference of the neighboring pixels. After execution of RB9, the process proceeds to RB10. It is noted that the neighboring pixels are pixels adjacent to a specific anomaly pixel of which gray-referenced difference is to be replaced, or a pixel apart from the specific anomaly pixel by a predetermined number of pixels so as not be affected by the gradation data of the specific anomaly pixel.

In RB10, it is determined whether determination of RB7 is made for all the pixels. When the determination of RB7 has not be made for all the pixels (RB10: NO), the process returns to RB7. When the determination in RB7 has been made for all the pixels (RB10: YES), the process proceeds to RB11.

The gray-referenced difference is set to the shading correction difference (RB11). That is, the current gray-referenced difference SAg1 for each pixel stored in the RAM 42 in RB2, and the gray-referenced difference replaced in RB9 are set to the shading correction difference. After execution of RB11, the shading correction difference setting is terminated.

When the shading correction difference setting process (FIG. 12) is started, the shading correction difference for each of the pixels of one line is retrieved (RC1). That is, the shading correction differences SAg1 set in RB11 are retrieved.

In accordance with the channel information stored in the flash PROM 43, the channel CHmax identified in M5 is set (RC2). As the channel CHmax is set, data processing to calculate the shading correction data in R8, only the gradation data corresponding to the analog signal output by the photoelectric conversion element 33 of the set channel CHmax, among six channels CH1-CH6, will be used.

From among the shading correction differences SAg1 for respective pixels in the identified channel CHmax, an N-th shading correction difference SAgmax1 at an N-th (N being a predetermined number) order from the maximum shading correction difference SAg1 is identified (RC3). The number of anomaly pixels of which gradation data may largely varies due to dust is preliminarily determined through experiment, and the predetermined number is set to that value. According to the illustrative embodiment, the predetermined number N is fifteen (15).

In RC4, the maximum value of the white-referenced differences is retrieved. That is, the maximum value SAwmax of the white-referenced differences Saw stored in the flash PROM 43 in M4 of the maintenance main process is retrieved.

In RC5, a shading target value Atw is calculated. That is, the shading target value Atw is calculated by multiplying the maximum gradation value by the difference ratio SAgmax1/SAwmax of the shading correction difference SAgmax1 identified in RC3 and the maximum value SAwmax retrieved in RC4. According to the illustrative embodiment, the maximum gradation value is represented by the 10-bit data and is "1023". The shading target value Atw is calculated as 10-bit data.

In RC6, for each pixel, the shading correction data is calculated. That is, by dividing the 10-bit maximum gradation value "1023" by the difference calculated by subtracting the average value Agb of the gray-referenced black data Dgb from the shading target value Atw, the shading correction data is calculated as follows:

Shading correction data=1023/($Atw-Agb$)

According to the illustrative embodiment, the maximum value SAwmax of the white-referenced difference SA2 is obtained in M4 (FIG. 5) using the white-reference original sheet GS, and the maximum value Dggmax of the gray-referenced gray data Dgg is obtained in MB12 (FIG. 7) using the gray reference plate 34, and both the maximum values SAwmax and Dggmax are stored in the flash PROM 43 before the original sheet GS is scanned.

Figure 12:
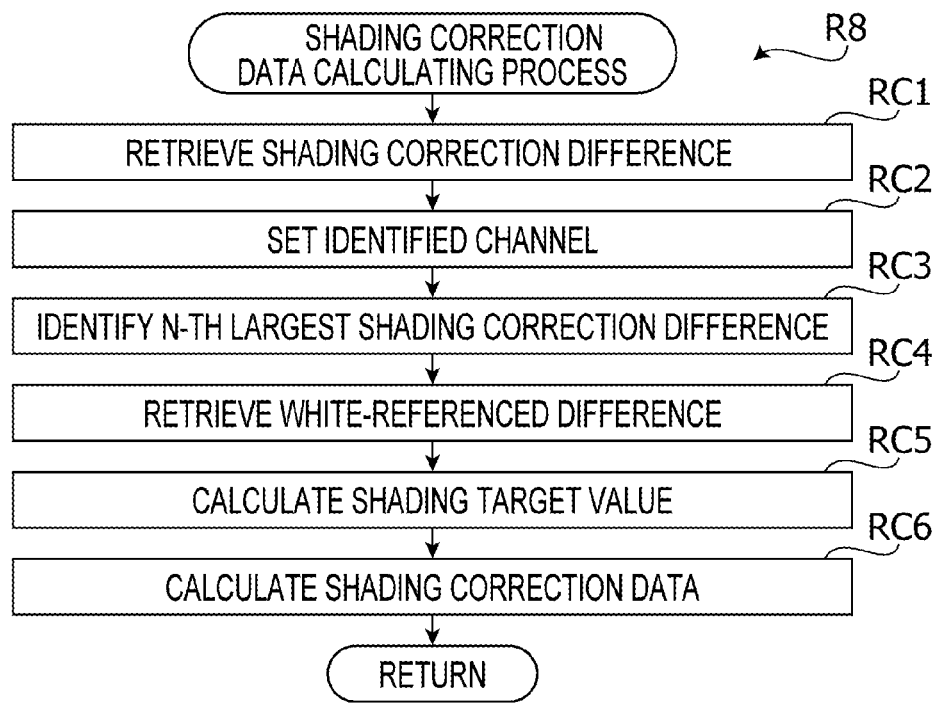
FIG. 12 is a flowchart illustrating a shading correction data calculation process, which is a sub process according to the illustrative embodiment of the disclosures.

When the original sheet GS is scanned using the gray reference plate 34, the electrical current VCrd1 and the illuminating period DLrd1 are obtained in accordance with the maximum value Dggmax in R3 of the scanning main process (FIG. 9), and the greatest shading correction difference SAgmax1 is obtained in RC3 of the shading correction data calculation (FIG. 12).

The greatest shading correction difference SAgmax1 represents the maximum value of the gray-referenced difference calculated by subtracting the average value Agb of the gray-referenced black data from the average Agw of the gray-reference white data.

The shading target value Atw is calculated in accordance with the difference ratio of the shading correction difference SAgmax1 and the maximum value Sawmax in RC5 (FIG. 12), and the shading correction data is calculated in accordance with the shading target value Atw in RC6 (FIG. 12).

As a result, when the original sheet GS is scanned, the shading target value Atw which is the white-referenced data necessary to calculate the shading correction data can be calculated without scanning the white reference member.

Further, the maximum value Dggmax is the maximum value of the gray gradation data output by the AFE 45 when the light source 30 illuminates the gray reference plate 34 in accordance with the electrical current and the illuminating period which are set so that the maximum value SAwmax is output.

As a result, when the white background of the original sheet GS is scanned with the light source 30 is powered on in accordance with the electrical current value VDrd1 and the illuminating period DLrd1 for scanning, the white gradation data output by the AFE 45 is close to the white-reference data which may be output by the AFE 45 when the white-referenced original sheet GS is scanned, and fluctuation of tone gradation causing lines or the like can be suppressed.

Further, with use of the gray reference plate 34, the show-through phenomenon can be reduced. Furthermore, with use of the gray reference plate 34, it is ensured to distinguish the white background part of the original sheet GS from the gray of the gray reference plate 34, and passage of the edges of the originals sheet GS can be detected.

Figure 10:
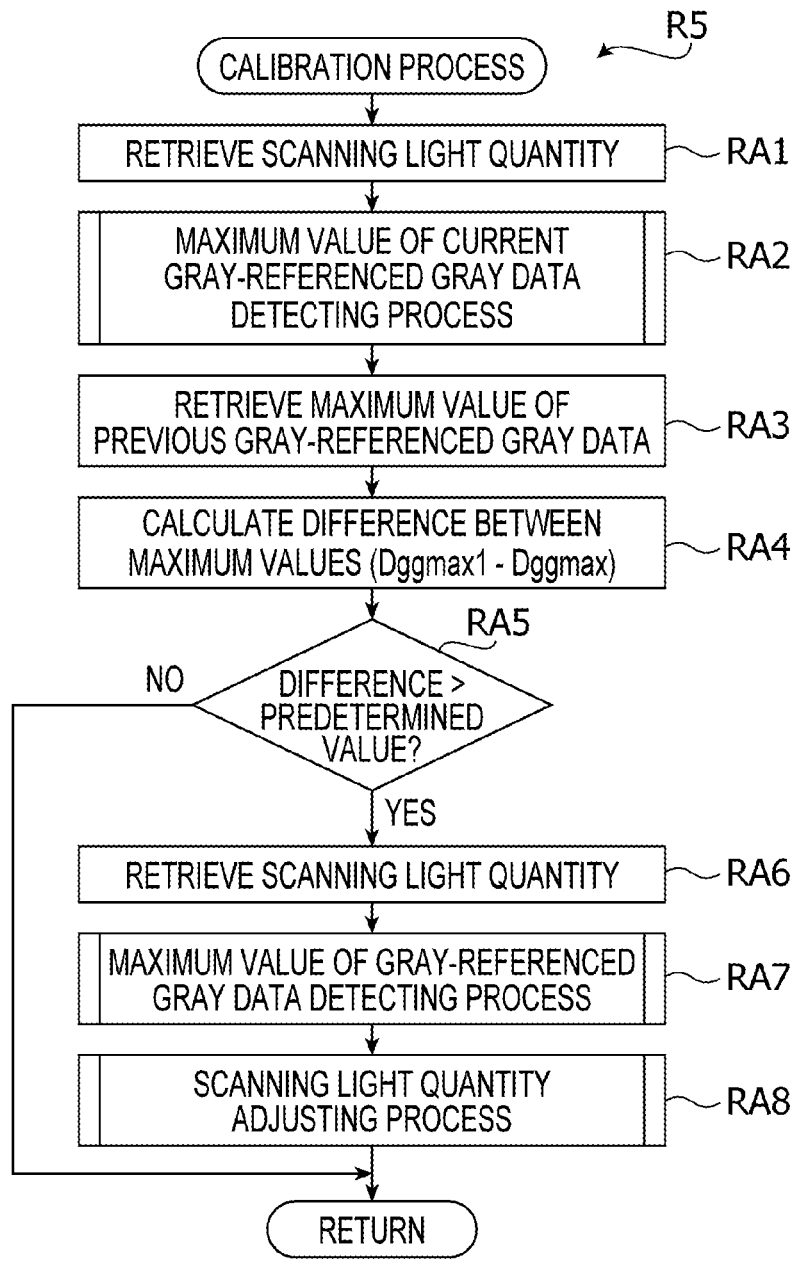
FIG. 10 is a flowchart illustrating a calibration process, which is a sub process according to the illustrative embodiment of the disclosures.

According to the illustrative embodiment, the calibration (R5) is executed in the scanning main process and the maximum value of the new gray-referenced gray data Dgg2 is obtained in RA7 and the new electrical current value VDrd2 and the new illuminating period DLrd2 are obtained in RA8 (FIG. 10). As a result, even if the gray reference plate 34 is deteriorated across the ages and the maximum value Dggmax is varied, the data necessary for scanning the original sheet GS, that is, the maximum value Dggmax, the electrical current value and the illuminating period are obtained again, accurate shading correction data can be generated.

According to the illustrative embodiment, in order to eliminate the gradation data of the anomaly pixels from the gradation data output by the AFE 45, the predetermined number referred to in MA5 and MA13 (FIG. 6), MB7 (FIG. 7), MC6 and MC14 (FIG. 8), R3 and R4 (FIG. 9) are set to the number of the anomaly pixels.

Further, the predetermined value set in RB6 (FIG. 11) is determined as a value to eliminate the effects of the anomaly pixels. As a result, the electrical current value and the illuminating period for shading, and the maximum value Dggmax can be set without being affected by the anomaly pixels.

The image scanning apparatus 1 and the gray reference plate 34 are examples of image scanning apparatus and gray reference member set forth in claims, respectively. Further, the scanning unit 24, the light source 30 and the photoelectric conversion elements 33 of the light receiving unit 31 are examples of scanning unit, light source and photoelectric conversion elements set forth in the claims, respectively. The AFE 34 is an example of a signal conversion unit set forth in the claims.

Steps M4, M7 and RA7 executed by the CPU 40 realize an example of an operation of a controller to obtain a greatest gradation value among a plurality of gradation values of gray signals and a first difference value obtained by subtracting the gradation value of a black signal output by the photoelectric conversion unit from the greatest gray gradation value which is set forth in the claims.

Steps R3 and RA8 executed by the CPU 40 realize an example of an operation of the controller to set a second light quantity set forth in the claims.

Steps R4 and R6-R8 executed by the CPU 40 realize an example of an operation of the controller to calculate a shading correction value set forth in the claims.

The flash PROM 43 is an example of a storage set forth in the claims.

A step RA5 executed by the CPU 40 realizes an example of an operation of the controller to determine set forth in the claims. The white-referenced white data Dww is an example of a first gradation value of a white signal set forth in the claims. The gray-referenced gray data Dgg is an example of a gray signal, and the maximum value Aggmax of the average value Agg is an example of the greatest gray gradation value set forth in the claims.

Further, the maximum value SAwmax of the differences SAw which are obtained by subtracting the average value Awb of the white-referenced black data Dwb from the average value Aww of the white-referenced white data Dww is an example of a first difference value set forth in the claims. Further, an average value Agw of the gray-referenced white data Dgw is an example of a second gradation value of the white signal set forth in the claims. Further, a maximum value SAgmx of the differences SAg which are obtained by subtracting an average Agb of the gray-referenced black data Dgb from the average value Agw of the gray-referenced white data Dgw is an example of a second difference value set forth in the claims.

It is noted that the above-described embodiment is an illustrative embodiment and the scope the disclosures should not be limited to the configuration of the illustrative embodiment. As described below, the illustrative embodiment can be modified in various ways without departing from the scope of the disclosures.

The image scanning apparatus 1 according to the illustrative embodiment could be applied to an MFP (multi-function peripheral) having a printer unit.

According to the illustrative embodiment, the image scanning apparatus has only one scanning unit 24 and one gray reference plate 34. The configuration could be modified, to scan both sides of the original sheet GS, such that two scanning units and tow gray reference plates may be provided to the image scanning apparatus.

According to the illustrative embodiment, the maintenance main process shown in FIG. 5 and the scanning main process shown in FIG. 9 are executed by the CPU 40. It is noted that the scope of the disclosures need not be limited to the configuration of the illustrative embodiment. For example, portions of steps M3-M5, M7-M9 of the maintenance main process and/or portions of R3-R8 of the scanning main process may be executed by the image processing unit 46. Alternatively, the above portions may be executed by an external device independent from the image scanning apparatus 1, for example, by a PC (personal computer).

According to the illustrative embodiment, the average value Agw of the gradation value of the gray-reference white data Dgw and the average value Agb or the gray-referenced black data for each pixel are calculated.

In RB1 (FIG. 11), the average Agw of the gray-referenced white data Dgw and the average value Agb of the gray-referenced black data for each of pixels of one line are retrieved in RB1 (FIG. 11). It is noted that the values retrieved in this step need not be limited to the average values.

For example, instead of the average values Agw and Agb, the gradation values of the gray-referenced white data Dgw and the gray-referenced black data Dgb may be used.

According to the illustrative embodiment, the channel CHmax is set in accordance with the channel information in MB2 (FIG. 7), MC2 (FIG. 8), R3 and R4 (FIG. 9), RA7 and RA8 (FIG. 10), and RC2 (FIG. 12). In these step, a channel is limited to the identified channel CHmax to which the photoelectric conversion element 33 outputting the analog signal corresponding to the brightest gradation value of the gradation data among the pieces of gradation data output from the AFE 45 for respective pixels of one line belongs, and the gradation data corresponding to the analog signal output by the photoelectric conversion element 33 of the identified channel CHmax is used.

However, the scope of the disclosures need not be limited to such a configuration. That is, the gradation data output by the AFE 45 for respective pixels of one line may be used. Alternatively, instead of limiting a channel to one identified channel CHmax, one identified channel CHmax and a channel next to the identified channel CHmax, from among the six channels CH1-CH6, may be used.

According to the illustrative embodiment, the overflow determination value is set to the gradation data of the highest gradation value stored in the flash PROM 43. This configuration may be modified such that the overflow determination value may be set to a predetermined gradation data smaller than "1023".

For example, the maximum value of the gray-reference white data, of the gradation data output by the AFE 45 for respective pixels of one line when the light source 30 illuminates the gray reference plate 34 with the maximum electrical current value and the longest illumination period, which are determined based on the configurations of the light source 30 and its driving circuit may be used as the overflow determination value. In such a case, the maximum value of the gray-reference white data is the data for the pixels of one line other that the anomaly pixels.

According to the illustrative embodiment, in order to eliminate the gradation data of the anomaly pixels from the gradation data output by the AFE 45, the number of anomaly pixels is set to the predetermined number that is set in MA5 and MA13 (FIG. 6), MB7 (FIG. 7), MC6 and MC14 (FIG. 8), and R3 and R4 (FIG. 9). However, the scope of the disclosures need not be limited to such a configuration.

For example, effects of the anomaly pixels are relatively small, the predetermined number may be set to one (1), or based on causes such as scanning accuracy of the scanning unit 24. Further, the predetermined value set in RB6 (FIG. 11) is also set to eliminate the effects of the anomaly pixels, this predetermined number may be set to zero (0) or a value which is determined based on other causes.

What is claimed is:

1. An image scanning apparatus, comprising:
 a gray reference member arranged in a conveying path in which an original sheet is to be conveyed, the gray reference member having a reflection coefficient smaller than that of a white color;
 a scanning unit configured to scan an image on the original sheet on a line basis, the scanning unit including a light source configured to illuminate the original sheet when the original sheet is passing the gray reference member and a plurality of photoelectric conversion elements aligned in a scanning direction which is a transverse direction of the conveying path;

a signal conversion unit configured to convert analog signals from the plurality of photoelectric conversion elements to digital signals; and a controller, wherein the controller is configured to:

obtain a greatest gray gradation value among a plurality of gradation values of gray signals output by the signal conversion unit when the light source illuminates the gray reference member at a first light quantity value, the first light quantity value being set so that white signals would be output by the signal conversion unit if the light source would illuminate a white reference member at the first light quantity value;

obtain a gradation value of a black signal output by the photoelectric conversion unit when the light source is powered off;

calculate a first difference value by subtracting the gradation value of the black signal from the greatest gray gradation value among a plurality of gradation values of gray signals;

set a second light quantity value such that a gray signal having the gray gradation value is output by the signal conversion unit when the light source illuminates the gray reference member at the second light quantity value;

set a correction light quantity value such that a white signal having a second gradation value is output by the signal conversion unit when the light source illuminates the gray reference member;

obtain a second difference value by subtracting the gradation value of the black signal from the second gradation value of a white signal which is output by the signal conversion unit when the light source illuminates the gray reference member in accordance with the correction light quantity value;

calculate a shading correction value based on a ratio of the second difference value to the first difference value;

control the scanning unit to scan the image on the original sheet with controlling the light source to illuminate the original sheet in accordance with the second light quantity value; and apply the shading correction to the digital signal output by the signal conversion unit in accordance with the shading correction value.

2. The image scanning apparatus according to claim 1, wherein the controller is further configured to:

obtain a greatest one of difference values which are calculated by subtracting the gradation value of the black signal from the gradation values of the white signals output by the signal conversion unit for respective pixels of one line when the light source illuminate the white reference member in accordance with the first light quantity value as the first difference value;

calculate a greatest one of difference values which are calculated by subtracting the gradation value of the black signal from the gradation values of the white signals output by the signal conversion unit when the light source illuminates the gray reference member in accordance with the correction light quantity value as the second difference value.

3. The image scanning apparatus according to claim 1, wherein the controller is further configured to:

calculate a shading target value in accordance with a ratio of the second difference value to the first difference value and the first gradation value; and generate the gradation value of the black signal and the shading target value as the shading correction values.

4. The image scanning apparatus according to claim 1, wherein the controller is further configured to set the correction light quantity value so that a greatest gradation value among gradation values which can be output by the signal conversion unit when the light source illuminates the gray reference member is obtained as the second gradation value.

5. The image scanning apparatus according to claim 1, further comprising a storage, and wherein the controller is further configured to store the gray gradation value and the first difference value, which are detected, in advance, when the light source illuminates the white reference member and the gray reference member, respectively, in accordance with the first light quality value in the storage.

6. The image scanning apparatus according to claim 1, wherein the controller is further configured to:

determine whether a gradation difference between a current maximum gray gradation value which is a greatest one of gradation values of the gray signals output by the signal conversion unit when the light source illuminates the gray reference member in accordance with the second light quantity value and a previously obtained maximum gray gradation value exceeds a predetermined value; and obtain the previous maximum gray gradation value instead of the current maximum gray gradation value before the scanning unit scans the image on the original sheet when it is determined that the gradation difference exceeds the predetermined value.

7. The image scanning apparatus according to claim 6, wherein the controller is further configured to set a new second light quantity value instead of the previously set second light quantity value so that the signal conversion unit outputs the gray signal having the current gray gradation value when the light source illuminates the gray reference member, when it is determined that gradation difference exceeds the predetermined value.

8. The image scanning apparatus according to claim 1, wherein the controller is further configured to set the second light quantity value such that the gradation values of the gray signals output by the signal conversion unit corresponding to a predetermined number of pixels which have gradation values greater than gradation values corresponding to remaining pixels are eliminated and a greatest gradation value from among the gradation values respectively corresponding to the remaining pixels become the gray gradation value when the light source illuminates the gray reference member.

9. The image scanning apparatus according to claim 1, wherein the controller is further configured to set the correction light quantity value such that the gradation values of the white signals output by the signal conversion unit corresponding to a predetermined number of pixels which have gradation values greater than gradation values corresponding to remaining pixels are eliminated and a greatest gradation value from among the gradation values respectively corresponding to the remaining pixels become the second gradation value when the light source illuminates the gray reference member.

* * * * *